(12) United States Patent
Gilstrap

(10) Patent No.: US 7,501,159 B1
(45) Date of Patent: Mar. 10, 2009

(54) USE OF CARPET SCRAPS TO IMPROVE PAINT COATING DURABILITY

(76) Inventor: James Gilstrap, 45411 Sierra Hwy., Lancaster, CA (US) 93534

( * ) Notice: Subject to any disclaimer, the term of this patent is extended or adjusted under 35 U.S.C. 154(b) by 0 days.

(21) Appl. No.: 11/880,759

(22) Filed: Jul. 23, 2007

(51) Int. Cl.
*B05D 5/00* (2006.01)

(52) U.S. Cl. ..................... 427/421.1; 427/427

(58) Field of Classification Search .............. 427/421.1, 427/427
See application file for complete search history.

(56) References Cited

U.S. PATENT DOCUMENTS

| | | | | |
|---|---|---|---|---|
| 4,155,896 A | * | 5/1979 | Rennier et al. | 523/200 |
| 4,782,112 A | * | 11/1988 | Kondo et al. | 524/837 |
| 4,927,710 A | * | 5/1990 | Tanaka et al. | 428/394 |
| 5,389,167 A | * | 2/1995 | Sperber | 156/71 |
| 6,059,207 A | | 5/2000 | Costello | |
| 6,241,168 B1 | | 6/2001 | Young | |
| 6,562,119 B2 | | 5/2003 | Jones, IV | |
| 6,723,424 B2 | | 4/2004 | Ricciardelli | |
| 6,780,356 B1 | * | 8/2004 | Putt et al. | 264/42 |
| 6,786,988 B1 | | 9/2004 | Bell | |
| 6,971,784 B1 | | 12/2005 | Bracegirdle | |
| 7,045,590 B2 | | 5/2006 | Bell | |
| 2003/0075824 A1 | | 4/2003 | Moore, Jr. | |
| 2005/0209439 A1 | | 9/2005 | Bell | |
| 2005/0233126 A1 | | 10/2005 | Pike | |

\* cited by examiner

*Primary Examiner*—Alain L Bashore
(74) *Attorney, Agent, or Firm*—Dennis W. Beech

(57) ABSTRACT

The present invention relates to methods of using carpet scraps to improve paint coating durability. Waste carpeting may be collected that may be formed from one or more of the materials polyamides, polyesters, polyurethane's, nylon and the like. The face yarn and nap material may be removed from the backing material of the waste carpeting. The face yarn and nap material may be mixed in a paint at a ratio of 50% or less by volume and in a manner to produce a generally uniform distribution of the face yarn and nap material in the paint.

4 Claims, No Drawings

USE OF CARPET SCRAPS TO IMPROVE PAINT COATING DURABILITY

BACKGROUND OF THE INVENTION

This invention relates to methods for improving paint coating durability, for example, latex exterior paint. The new method uses carpet scraps and more particularly the carpet face yarn or nap material in a mixture with the paint to then be applied as a surface coating.

Use of carpet scraps may be know wherein the carpet scrap material is processed in some manner, such as reducing the size by grinding, to then be added to other standard material to make products such as backing material for carpet manufacture. The carpet scraps may also be melted and palletized for use as a filler to make homogenous thermoplastic blends. Carpet waste may also be used in microwave heating processes to produce material such as carbon black to improve weathering of bituminous coatings. Waste carpeting may be ground or melted and palletized for use as filler for various extruded thermoplastic and thermoset materials that typically use calcium carbonate filler such as roofing materials, road paving materials, awnings and tarps.

SUMMARY OF THE INVENTION

The present invention is directed to methods of using carpet scraps to improve paint coating durability. Waste carpeting may be collected that may be formed from one or more of the materials polyamides, polyesters, polyurethane's, nylon and the like. The face yarn and nap material may be removed from the backing material of the waste carpeting. The face yarn and nap material may be mixed in a paint at a ratio of 50% or less by volume and in a manner to produce a generally uniform distribution of the face yarn and nap material in the paint.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

A method for improving paint coating durability may use carpet scrap material mixed with a paint, such as an exterior latex paint, to form a mixture that when applied to coat a surface will exist for a long time without significant deterioration. The carpet scrap material may be the carpet face yarn or nap material that may have been shaved, cut or otherwise removed from the backing portion of a carpet. Generally modern carpet face yarn or nap material may be formed from polymers such as polyamides, polyesters, polyurethane's and the like, and often may be nylon.

A method of preparing the paint mixture material may include collecting waste or scrap carpeting constructed of nylon, polyester, polyamides and the like and removing the face yarn or nap material from the backing material. It has been found that for this method the use of elements of carpet backing may not be suitable. The nap material may be shaved or otherwise separated from the backing material.

The carpet nap scrap material may be mixed with a paint coating material that may be an aqueous-base such as latex paint in a ratio of approximately 1 part carpet scrap nap material to 4 parts paint by volume. For example, a gallon of paint may have a quart of loosely packed carpet scraps mixed therein. The carpet scraps should be sufficiently mixed with the paint to provide a generally uniform distribution of the carpet scrap in the paint to allow a relatively uniform, even spreading of the paint coat with carpet scraps.

Depending on the length of the carpet yarn scrap material, variable coating characteristics may be developed, for example, tensile strength, tendency to crack or like features. A carpet yarn scrap may have elements that may be one half inch in length. A carpet yarn scrap and paint mixture may be applied using a paint spray apparatus or other paint application devices. The paint mixture coating may be smoothed with a broad knife or trowel before curing to allow a smooth paint coating.

The carpet yarn scrap and paint mixture material may produce a flexible, reduced cracking coating for surfaces and may allow recycling of the carpet yarn or nap portion of waste carpet. While a mixture ratio of approximately 20% carpet yarn scraps with 80% latex paint by volume has been disclosed for applying a durable paint coating of smooth paint on a surface, other ratios of mixture may be used. For example, adding more carpet yarn scraps has been found to create a thickened paint mixture that may be used to fill a cavity or a hole prior to using a less thick paint mixture to form a smooth coating surface on a structure or object. Mixture ratios of carpet yarn scraps of 50% to latex exterior paint of 50% by volume have been found to function as a thickened coating material.

While the invention has been particularly shown and described with respect to the illustrated embodiments thereof, it will be understood by those skilled in the art that the foregoing and other changes in form and details may be made therein without departing from the spirit and scope of the invention.

I claim:

1. A method of using carpet scraps to improve aqueous based paint coating durability comprising:
    (a) collecting waste carpeting formed from at least one of the following materials: polyamides, polyesters, polyurethane and nylon;
    (b) removing the face yarn and nap material from the backing material of the waste carpeting;
    (c) mixing the face yarn and nap material wherein the face yarn and nap material are at least one half inch in length with a paint at a ratio of 50% or less face yarn and nap material to the paint volume; and
    (d) wherein step (c) is practiced to produce a generally uniform distribution of the face yarn and nap material in the paint to form a paint mixture.

2. The method as in claim 1 wherein the ratio is approximately 20% carpet yarn and nap material to 80% paint by volume.

3. The method as in claim 1 wherein the paint mixture is applied on a surface with a paint sprayer apparatus.

4. The method as in claim 3 wherein a trowel is used to smooth the applied paint mixture.

* * * * *